United States Patent
Kajiwara et al.

(10) Patent No.: US 10,950,867 B2
(45) Date of Patent: Mar. 16, 2021

(54) ELECTRODE, REDOX FLOW BATTERY, AND METHOD FOR PRODUCING ELECTRODE

(71) Applicant: TORAY INDUSTRIES, INC., Tokyo (JP)

(72) Inventors: Kentaro Kajiwara, Otsu (JP); Masamichi Utsunomiya, Otsu (JP); Fumitaka Watanabe, Otsu (JP); Yasuaki Tanimura, Otsu (JP)

(73) Assignee: TORAY INDUSTRIES, INC., Tokyo (JP)

( * ) Notice: Subject to any disclaimer, the term of this patent is extended or adjusted under 35 U.S.C. 154(b) by 58 days.

(21) Appl. No.: 16/346,792

(22) PCT Filed: Dec. 11, 2017

(86) PCT No.: PCT/JP2017/044371
§ 371 (c)(1),
(2) Date: May 1, 2019

(87) PCT Pub. No.: WO2018/110498
PCT Pub. Date: Jun. 21, 2018

(65) Prior Publication Data
US 2019/0260033 A1     Aug. 22, 2019

(30) Foreign Application Priority Data
Dec. 13, 2016   (JP) .............................. JP2016-241007

(51) Int. Cl.
*H01M 4/66*    (2006.01)
*H01M 8/18*    (2006.01)
(Continued)

(52) U.S. Cl.
CPC ............. *H01M 4/663* (2013.01); *C25B 11/02* (2013.01); *H01M 4/88* (2013.01); *H01M 4/96* (2013.01);
(Continued)

(58) Field of Classification Search
None
See application file for complete search history.

(56) References Cited

U.S. PATENT DOCUMENTS

| | | | | |
|---|---|---|---|---|
| 2003/0087156 | A1* | 5/2003 | Broman | ............... H01M 4/8626 429/235 |
| 2003/0138689 | A1* | 7/2003 | Koschany | ............... H01M 4/96 429/510 |

(Continued)

FOREIGN PATENT DOCUMENTS

| | | |
|---|---|---|
| CN | 110036513 A | 7/2019 |
| EP | 0727837 A1 | 8/1996 |

(Continued)

OTHER PUBLICATIONS

Chinese Office Action, dated Feb. 3, 2020, for Chinese Application No. 201780075749.4, along with an English translation.

(Continued)

*Primary Examiner* — Scott J. Chmielecki
(74) *Attorney, Agent, or Firm* — Birch, Stewart, Kolasch & Birch, LLP (57) ABSTRACT

An object of the present invention is to provide an electrode which is used for a liquid flow-through device and in which liquid flow-through resistance is reduced and the utilization efficiency of the surface of carbon fiber is enhanced. Another object of the present invention is to provide a redox flow battery having excellent charge-discharge performance by use of the electrode which is used for the liquid flow-through device. The present invention provides an electrode to be (Continued)

used for a liquid flow-through device, the electrode including a plurality of sheets of carbon fiber nonwoven fabric each having irregularities on a surface of the sheet of carbon fiber nonwoven fabric being stacked or each having a through-hole on the carbon fiber sheet being stacked, and having inside of the electrode a plurality of gaps which is formed by recesses of the irregularities or the through-hole and is not opened in a thickness direction.

11 Claims, 2 Drawing Sheets

(51) Int. Cl.
*H01M 4/88* (2006.01)
*H01M 4/96* (2006.01)
*H01M 4/02* (2006.01)
*C25B 11/02* (2021.01)
*C25B 11/12* (2006.01)

(52) U.S. Cl.
CPC ............ *H01M 8/18* (2013.01); *H01M 8/188* (2013.01); *C25B 11/12* (2013.01); *H01M 2004/021* (2013.01); *Y02E 60/50* (2013.01)

(56) References Cited

U.S. PATENT DOCUMENTS

| | | |
|---|---|---|
| 2015/0295247 A1 | 10/2015 | Kumbur et al. |
| 2016/0322646 A1 | 11/2016 | Kajiwara et al. |
| 2019/0312295 A1* | 10/2019 | Kajiwara ............ H01M 4/8626 |

FOREIGN PATENT DOCUMENTS

| | | |
|---|---|---|
| EP | 2637239 A1 | 9/2013 |
| JP | 3-285873 A | 12/1991 |
| JP | 2003-64566 A | 3/2003 |
| JP | 2005-317240 A | 11/2005 |
| JP | 2007-269624 A | 10/2007 |
| JP | 2013-108188 A | 6/2013 |
| WO | WO 2015/098530 A1 | 7/2015 |

OTHER PUBLICATIONS

Extended European Search Report, dated Feb. 24, 2020, for European Application No. 16780916.6.
International Search Report, issued in PCT/JP2017/044371, PCT/ISA/210, dated Mar. 6, 2018.
Written Opinion of the International Searching Authority, issued in PCT/JP2017/044371, PCT/ISA/237, dated Mar. 6, 2018.

* cited by examiner

ELECTRODE, REDOX FLOW BATTERY, AND METHOD FOR PRODUCING ELECTRODE

TECHNICAL FIELD

The present invention relates to an electrode, a redox flow battery, and a method for producing an electrode.

BACKGROUND ART

Liquid flow-through devices such as electrodialysis devices for desalination, salt formation or ion separation, water electrolysis devices for obtaining hydrogen, fuel cells used for power generation, and secondary batteries such as redox flow batteries are used in various fields, and required to have higher performance.

Redox flow batteries, which are a type of liquid flow-through devices, are expected to come into wide use as storage batteries for stabilizing electric power systems by storing and discharging electric power generated in wind power generation and solar power generation because it is easy to increase or decrease the energy capacity, and the batteries have a long life, and allow the battery charge state to be known.

The redox flow battery is a battery in which in at least one of a positive electrode and a negative electrode, an electrolytic solution containing an active material is supplied to perform charge and discharge through oxidation-reduction reaction. Examples of the active material that is used include ions of vanadium, halogens, iron, zinc, sulfur, titanium, copper, chromium, manganese, cerium, cobalt, lithium and the like, compound ions thereof, and nonmetallic quinone-based compound ions and aromatic compound ions.

The charge-discharge performance of a redox flow battery is known to considerably depend on ease of contact between an electrolytic solution and the surface of an electrode formed generally of a carbon fiber nonwoven fabric. As means for facilitating contact between an electrode and an electrolytic solution, mention is made of a method in which the area of an electrode is increased by increasing the amount of the electrode, and a method in which the utilization efficiency of the electrode surface is enhanced. Since an increase in the amount of an electrode leads to an increase in cost, an attempt has been made to enhance the utilization efficiency of the electrode surface.

In a redox flow battery that is generally used, electrochemical cells (hereinafter, referred to as cells) of type in which an electrolytic solution flows in the plane direction of an electrode including a flat plate-shaped carbon fiber nonwoven fabric (flow-through type) are laminated (stacked). However, gaps between carbon fibers in the carbon fiber nonwoven fabric have variations in size, and the electrolytic solution easily flows toward large gaps in the electrode. Thus, there is a problem that the electrolytic solution is easily retained in a region where small gaps are formed.

With regard to means for ensuring that an electrolytic solution uniformly flows, studies have been heretofore conducted for the purpose of reducing the energy consumption in a pump. For example, Patent Document 1 suggests a technique in which a groove is formed on at least one surface of an electrode. Patent Document 2 suggests a technique in which projections are dispersively formed on at least one surface of an electrode.

In addition, a cell of type in which an electrolytic solution flows through a groove channel formed on the surface of a current collector (flow-by type) is suggested. This method makes it possible to ensure that the energy consumption in a pump can be kept low even when liquid flow-through resistance in an electrode is high because the liquid flows along a cross section overwhelmingly larger in size than the gap in the electrode. However, in a cell of flow-by type, an electrolytic solution slows along the surface of an electrode, and therefore it is difficult for the liquid to flow in the thickness direction of the electrode, so that there is the problem that it is difficult to ensure that the electrolytic solution uniformly flows in the electrode. On the other hand, Patent Document 3 suggests a technique in which a through-hole is formed in the thickness direction of an electrode for reducing electrical conduction resistance with a thin electrode having a high density and facilitating flow of the liquid in the thickness direction of the electrode in a redox flow battery of flow-by type. In addition, Patent Document 4 suggests a technique in which by stacking a thin fiber layer on a fiber layer formed of thick fiber, an electrode surface area is increased to improve performance.

PRIOR ART DOCUMENT

Patent Documents

Patent Document 1: Japanese Patent Laid-open Publication No. 8-287923
Patent Document 2: Japanese Patent Laid-open Publication No. 2003-64566
Patent Document 3: U.S. Patent Application Publication No. 2015/0295247
Patent Document 4: Japanese Patent Laid-open Publication No. 2015-122229

SUMMARY OF THE INVENTION

Problems to be Solved by the Invention

The electrode in which a groove is formed as described in Patent Document 1 has an effect of reducing liquid flow-through resistance, but the groove is formed in parallel to the liquid flow. Thus, the liquid preferentially flows into the groove portion, so that the surface of the carbon fiber in a portion other than the groove is hardly used, and the effect of improving charge-discharge performance is not sufficient.

In the electrode having a geometry in which dents (portions other than projections) are continuous in the surface as described in Patent Document 2, the electrolytic solution preferentially flows into the dent portions. Therefore, as in the electrode in Patent Document 1, it is difficult to use the surface of the carbon fiber in portions other than the dents, and similarly, the effect of improving the charge-discharge performance is not sufficient.

In the technique in Patent Document 3, improvement of electrical conductivity and reduction of liquid flow-through resistance can be expected, but contact with the electrolytic solution is not sufficient because the electrode has a small thickness, and thus a small surface area.

In the technique in Patent Document 4, a thin fiber layer of an electrode in which a thick fiber layer and the thin fiber layer are stacked has a high porosity, and thus an effect of reducing liquid flow-through resistance is exhibited, but there is a disadvantage in terms of productivity and cost because it is necessary to produce the thick fiber layer and the thin fiber layer by different production methods.

An object of the present invention is to provide an electrode which is used for a liquid flow-through device and in which liquid flow-through resistance is reduced and the utilization efficiency of the surface of carbon fiber is enhanced. Another object of the present invention is to provide a redox flow battery having excellent charge-discharge performance by use of the electrode which is used for the liquid flow-through device.

Solutions to the Problems

For solving the above-described problems, the present invention provides an electrode to be used for a liquid flow-through device, the electrode comprising a plurality of carbon fiber sheets each having irregularities on a surface of the carbon fiber sheet being stacked or each having a through-hole on the carbon fiber sheet being stacked, and having inside of the electrode a plurality of gaps which is formed by recesses of the irregularities or the through-hole and is not opened in a thickness direction. A preferred aspect of the present invention is an electrode to be used for a redox flow battery, and the redox flow battery of the present invention has a cell formed using the electrode of the present invention. A method for producing an electrode to be used for a liquid flow-through device according to the present invention includes stacking a plurality of carbon fiber sheets each having irregularities on a surface of the carbon fiber sheet or a through-hole on the carbon fiber sheet such that a plurality of gaps which is formed by recesses of the irregularities or the through-hole and is not opened in a thickness direction is formed inside the electrode.

Effect of the Invention

In the electrode to be used in a liquid flow-through device according to the present invention, the presence of a plurality of gaps inside the electrode prevents nonuniformity of the flow of an electrolytic solution in the electrode, so that the utilization efficiency of the surface of carbon fiber is enhanced. An efficient chemical reaction can be attained by using the electrode for a liquid flow-through device. In addition, when the electrode to be used for a liquid flow-through device according to the present invention is used for a redox flow battery which is a preferred aspect of the present invention, excellent charge-discharge performance can be attained.

EMBODIMENTS OF THE INVENTION

[Electrode Used for Liquid Flow-Through Device]

A liquid flow-through device according to the present invention is a device having a liquid and an electrode, the liquid flowing while being in contact with the electrode, and chemically reacting on the surface of the electrode. Examples of the device include liquid flow-through devices such as electrodialysis devices for desalination, salt formation or ion separation, water electrolysis devices for obtaining hydrogen, fuel cells used for power generation, and secondary batteries such as redox flow batteries. Among them, redox flow batteries are typical liquid flow-through devices.

The electrode to be used for a liquid flow-through device according to the present invention is suitably used as an electrode to be used for a redox flow battery. Details of the electrode to be used for a liquid flow-through device according to the present invention will be described with an example of an electrode to be used for the later-described redox flow battery which is a typical liquid flow-through device.

[Electrode Used for Redox Flow Battery]

The electrode to be used for a redox flow battery according to the present invention includes a plurality of carbon fiber sheets being stacked. Hereinafter, in this specification, the single term "electrode" refers to an electrode to be used for a redox flow battery.

As the carbon fiber sheet, a carbon fiber nonwoven fabric formed of carbon fiber, carbon paper, a carbon fiber woven fabric or a carbon fiber knitted fabric can be used. The carbon fiber nonwoven fabric is a nonwoven fabric obtained by carbonizing a carbon fiber precursor nonwoven fabric obtained by cutting carbon fiber precursor to about several tens of mm (generally 38 mm to 102 mm), then processing the fiber into a web, and interlacing the fibers by needle punching or water jet processing, or heating and bonding the fibers, or bonding the fibers with a binder. The carbon paper is obtained by chopping carbon fiber or carbon fiber precursor (carbon fiber is generally used) to a length of about 10 mm, forming the thus-obtained short carbon fiber or short carbon fiber precursor into a sheet, binding the sheet with a carbonizable resin component such as a phenol resin, and then performing carbonization or graphitization. The carbon fiber woven fabric or the carbon fiber knitted fabric is a sheet obtained by forming carbon fiber precursor filaments into a sheet by a weaving machine or a knitting machine to obtain a woven fabric or a knitted fabric, and carbonizing the woven fabric or the knitted fabric. From the viewpoint of productivity, a carbon fiber nonwoven fabric or carbon paper can be preferably used as a carbon fiber sheet.

Examples of the carbon fiber precursor include rayon fiber, acrylic fiber and lignin fiber, and acrylic fiber (polyacrylonitrile fiber) is preferable from the viewpoint of mechanical strength and cost. In addition, as the carbon fiber precursor, a flameproof thread obtained by subjecting acrylic fiber to heat treatment (flameproofing treatment) in air at 200 to 300° C. may be used. When a flameproof thread is not used, it is also possible to perform flameproofing treatment after forming carbon fiber precursor into a carbon fiber sheet.

The sheet including a carbon fiber precursor thus obtained can be subjected to heat treatment at 1000 to 3000° C. in an inert atmosphere to obtain a carbon fiber sheet. When the heat treatment temperature is lower than 2000° C., durability tends to be deteriorated, and therefore the heat treatment temperature is preferably 2000° C. or higher.

In addition, in an electrode to be used for a redox flow battery, it is necessary that an electrolytic solution easily come into sufficient contact with the surface of carbon fiber, and therefore the surface of carbon fiber forming a carbon fiber sheet may be modified to improve the wettability of the electrolytic solution. In this case, as a method for modifying the surface of carbon fiber, air oxidation and electrolytic oxidation, which are excellent from the viewpoint of processability and cost, can be preferably employed. The temperature of the heat treatment and the modification of the surface of carbon fiber are appropriately set in view of battery performance and durability.

In a first aspect of the electrode of the present invention, a plurality of carbon fiber sheets each having irregularities on the surface is stacked. The irregularities may be formed on one surface or both surfaces of each carbon fiber sheet forming the electrode. The carbon fiber sheets can be stacked to obtain an electrode having a plurality of gaps which is formed by recesses of the irregularities and is not opened in a thickness direction.

The irregularities in the present invention may be those that can be recognized as a macroscopic recess apart from microscopic irregularities developed by fiber itself and gaps between carbon fibers in the carbon fiber nonwoven fabric when a visual field larger in size than a square of 0.5 mm on each side is observed with an optical microscope with downwardly incident light. For example, when observation with a shape measuring microscope (downwardly incident light) reveals that a carbon fiber sheet including recesses including both of carbon fiber and gaps and projections including both of carbon fiber and gaps are present, it can be determined that irregularities are formed. The irregularities of the carbon fiber sheet may be irregularities (groove portions and ridge portions) formed continuously from one end to the other end of the carbon fiber sheet in plan view, or may be noncontinuous irregularities. In particular, a shape having non-through-holes or grooves as recesses is preferable. The non-through-hole is a hole having an opening only on one surface of the carbon fiber sheet. In addition, the groove is a recess continuously formed linearly or curvedly on the surface of the carbon fiber sheet. When a carbon fiber sheet having groove-shaped irregularities is used, it is preferable that an electrode is formed by stacking carbon fiber sheets such that the grooves extend in the same direction, and the electrode is disposed in a cell such that the grooves extend in a direction different from (typically orthogonal to) a direction in which an electrolytic solution flows (from inlet to outlet) for preventing the electrolytic solution from collectively flowing through the grooves.

In addition, it is preferable that the recesses and the projections are regularly arranged, i.e., they have a pattern. In this specification, the arrangement of irregularities which can be recognized in plan view of the electrode in a form where irregularities are regularly arranged is referred to as an "irregularity pattern". It is preferable that the carbon fiber sheet has no anisotropy in the pattern in MD and TD, i.e., it has an isotropic irregularity pattern. The irregularity pattern is particularly preferably a dotted pattern, i.e., a shape in which projections are present in the form of islands with recesses as sea; a shape in which recesses (non-through-holes) are present in the form of islands with projections as sea; a checkered pattern, i.e., a shape in which substantially rectangular recesses and projections are alternately arranged; or a striped pattern, i.e., a pattern in which linear recesses (grooves) and linear projections (ridges) are alternately arranged.

When the irregularity pattern is a dotted pattern or a checkered pattern, the dot formation pitch is preferably 100 µm to 15 mm, more preferably 200 µm to 8 mm, still more preferably 400 µm to 5 mm in both longitudinal and lateral directions. In addition, the opening diameter of the recess is preferably 10 mm or less, more preferably 5 mm or less, still more preferably 3 mm or less. In this specification, the opening diameter of the recess is a diameter calculated from an opening area on the assumption that the recess has a circular shape. Further, the dot formation density is preferably 30/cm$^2$ to 5000/cm$^2$, more preferably 100/cm$^2$ to 2000/cm$^2$. The dot formation pitch and the opening diameter of the recesses may be the same or different. When they are different, it is preferable that all the values fall within the above-mentioned preferred range, but they may have irregular values as long as they substantially fall within the above-mentioned preferred range. The same applies to other parameters below.

In addition, when the irregularity pattern is a striped pattern, the projection formation pitch is preferably 80 µm or more, more preferably 300 µm or more, still more preferably 800 µm or more. In addition, the width of the groove-shaped recess is preferably 50 µm or more, more preferably 200 µm or more, still more preferably 500 µm or more. The projection formation pitch and the width of the groove-shaped recess may be the same or different.

The height of the irregularities is preferably more than 50 µm, more preferably more than 100 µm. When the height of the irregularities is 100 µm or less, the size of gaps in the electrode decreases, so that the effect of the present invention is reduced. Although there is no upper limit on the height of the irregularities, the height of irregularities is preferably 10.0 mm or less. The height of the irregularities of the carbon fiber sheet is a vertical distance from the tip of the projection to the lower end of the recess, which is measured with pressure applied to an irregularity-formed surface with an area of φ 5 mm or more at a surface pressure of 0.15 MPa. The height of the irregularities may be the same or different.

In addition, the ratio of the height of the irregularities to the thickness of the carbon fiber sheet (height of irregularities/thickness of carbon fiber sheet) is preferably 0.5 or more, more preferably 0.6 or more. This is because the larger the ratio is, the greater the effect of uniformizing liquid flow-through. The upper limit of the ratio is not particularly limited, but when the ratio is 0.9 or less, the effect of reducing electrical conduction resistance of the surface on which irregularities are not formed is enhanced.

The opening area ratio of the recesses in the carbon fiber sheet (opening area of recess/total area) is preferably 5% or more, more preferably 10% or more. The opening area ratio of the recesses (opening/total area) is preferably 90% or less, more preferably 50% or less. When the opening area ratio is less than 5%, it is difficult to obtain the effect of the present invention, and when the opening area ratio is more than 90%, the electrode is apt to have a region which is not pressed against a current collector, and therefore electrical conduction resistance between the electrode and current collector easily increases.

Such irregularities can be formed by mechanical processing with a piercing member or laser processing. Such processing may be performed at either the stage of a carbon fiber precursor sheet or the stage of a carbon fiber sheet after heat treatment.

In addition, it is preferable that broken fiber is not observed at the peripheral edge portion of the recess in plan view. This is because when fiber in the vicinity of the recess is not broken, mechanical properties are improved, and handling is facilitated. Thus, it is preferable that a shaping member having a projection corresponding to the shape of the non-through-hole is pressed against a carbon fiber precursor sheet to form irregularities and heat treatment is then performed to prepare a carbon fiber sheet because carbon fiber is hardly broken. It is preferable to use a carbon fiber sheet in which broken fiber is not observed at the peripheral edge portion of majority recesses in plan view. The broken fiber on the peripheral edge portion of the recess is fiber for which observation of any recess with a microscope reveals formation of a fiber end along the shape of the recess, e.g. fiber for which five or more fiber ends are observed on the peripheral edge portion of the recess. The peripheral edge portion of the recess in the present invention is a boundary (edge portion) between the projection as sea and the recess as an island.

The irregularities of the carbon fiber sheet may be those that can be recognized as macroscopic irregularities apart from microscopic irregularities developed by carbon fiber itself of the carbon fiber sheet when a visual field larger in size than a square of 0.5 mm on each side is observed with an optical microscope with downwardly incident light. For example, an irregularity-formed surface is scanned with a shape measuring microscope (downwardly incident light) to capture an image, inclination correction is performed using shape analysis software, portions having a thickness smaller than the size of a surface corresponding to a thickness of a carbon fiber sheet pressurized at a surface pressure of 0.15 MPa are taken as recesses, portions having a larger thickness are taken as projections, and an average opening diameter of the recesses is measured, and when this average opening diameter is larger than an average opening diameter obtained by performing image analysis of an image of a carbon fiber sheet microscopically observed with transmitted light (average opening diameter of gaps of carbon fiber sheet itself), it can be determined that irregularities are formed.

In a second aspect of the present invention, a plurality of carbon fiber sheets each having a through-hole is stacked. The carbon fiber sheets can be stacked such that through-holes are not formed continuously in a thickness direction, i.e., through-holes of adjacent carbon fiber sheets are shifted from each other, to obtain an electrode having a plurality of gaps which is formed by recesses of the irregularities and is not opened in a thickness direction.

It is preferable that the through-holes are regularly arranged, i.e., they have a pattern. It is preferable that the through-holes have no anisotropy in the pattern in MD and TD, i.e., they have an isotropic pattern.

It is particularly preferable that the pattern of the through-holes has a dotted pattern. When the pattern of the through-holes is a dotted pattern, the preferred ranges of the dot formation pitch and formation density are similar to those in the case of the dotted irregularity pattern (pattern in which non-through-holes are dispersedly formed in a dotted pattern) in the first aspect.

The opening area ratio (opening/total area) of the through-holes of the carbon fiber sheet is preferably 5% or more, more preferably 10% or more. The opening area ratio (opening/total area) of the through-holes is preferably 90% or less, more preferably 50% or less. When the opening area ratio is less than 5%, it is difficult to obtain the effect of the present invention, and when the opening area ratio is more than 90%, the electrode is apt to have a region which is not pressed against a current collector, and therefore electrical conduction resistance between the electrode and current collector easily increases.

The through-hole can be formed by mechanical processing with a piercing member or laser processing. Such processing may be performed on the carbon fiber precursor nonwoven fabric or on the carbon fiber sheet after heat treatment. As with the first aspect, it is preferable that broken fiber is not observed at the peripheral edge portion of the through-hole in plan view. Thus, it is preferable that a through-hole is formed by a method in which a piercing member having a tapered end is pressed against a carbon fiber precursor nonwoven fabric to pierce the fiber nonwoven fabric, and heat treatment is then performed to obtain a carbon fiber sheet because carbon fiber is hardly broken.

The through-hole of the carbon fiber sheet may be one that can be recognized apart from a gap in the carbon fiber sheet itself when a visual field larger in size than a square of 0.5 mm on each side is observed with an optical microscope with transmitted light. In addition, when a through-hole is formed in a regular pattern, transmitted light passing through a gap of the carbon fiber sheet itself and transmitted light passing through the through-hole are both observed in image analysis of an image of the carbon fiber sheet microscopically observed with transmitted light and photographed, and therefore formation of the through-hole can be confirmed from presence of a plurality of peaks in a distribution of the frequency (area base) of the opening diameter of the gap (region where transmitted light is observed).

The electrode to be used for the redox flow battery of the present invention has been described above separately as the first aspect and the second aspect for the sake of convenience, but may be one in which both a carbon fiber sheet having irregularities on a surface thereof and a carbon fiber sheet having a through-hole on a surface thereof are stacked.

The basis weight of the electrode to be used for the redox flow battery is preferably 50 to 1000 $g/m^2$, more preferably 100 to 500 $g/m^2$. When the basis weight is less than 50 $g/m^2$, the surface area of the electrode is apt to be insufficient, and when the basis weight is more than 1000 $g/m^2$, productivity is deteriorated.

In addition, it is preferable that the electrode to be used for the redox flow battery has a thickness of more than 0.40 mm. When the thickness is 0.40 mm or less, the liquid flow-through resistance of the electrolytic solution easily increases. The thickness of the electrode is more preferably 0.5 mm or more, more preferably more than 0.60 mm. The upper limit of the thickness of the electrode is not particularly limited, but when the thickness is excessively large, electrical conduction resistance easily increases, and thus the thickness is preferably 10.0 mm or less, more preferably 6.0 mm or less. It is to be noted that the thickness of the electrode herein is a thickness measured with pressure applied to an electrode, in which carbon fiber sheets are stacked, over an area of φ5 mm or more at a surface pressure of 0.15 MPa. The thickness of one carbon fiber sheet to be stacked is preferably 0.05 to 5.0 mm, more preferably 0.10 to 2 mm, still more preferably 0.15 to 1 mm. When the thickness is more than 0.05 mm, handling is facilitated, and when the thickness is 5 mm or less, it is possible to increase the number of stacked sheets, leading to improvement of uniformity of liquid flow-through in a thickness direction.

Preferably, the electrode to be used for the redox flow battery according to the present invention has a density of 0.40 $g/cm^3$ or more. When the density is high, high electrical conductivity is obtained and the amount of the electrode in the cell is increased, but liquid flow-through easily becomes nonuniform. However, when the uniformization technique according to the present invention is used, it is possible to have both high density and uniformity of liquid flow-through. The density is more preferably 0.50 $g/cm^3$ or more, still more preferably 0.60 $g/cm^3$ or more.

The volume ratio of gaps in the electrode is preferably 10 to 80%, more preferably 20 to 70%. When the volume ratio is more than 10%, the effect of uniforming liquid flow-through is enhanced, and when the volume ratio is less than 80%, excellent electrical conductivity can be obtained. The volume ratio of gaps can be measured in the following manner: a region larger in size than a square of 5 mm on each side is measured and analyzed by X-ray CT, and the volume of a space surrounded by electrodes on the layers is divided by the volumetric capacity of the electrodes.

The number of the carbon fiber sheets stacked is not particularly limited, but is preferably 3 or more, more preferably 4 or more, still more preferably 5 or more. As the number of sheets becomes larger, the number of gaps in the electrode increases, so that the effect of uniforming flow-through of the electrolytic solution in the thickness direction of the electrode is enhanced. The upper limit of the number of layers stacked is not particularly limited, but is preferably 20 or less from the viewpoint of productivity.

In the electrode of the present invention, it is preferable that the carbon fiber sheets are fixed together while being stacked because handling is facilitated. The "fixing" mentioned in the present invention means that when the uppermost layer of the stacked carbon fiber sheets is held, and slowly raised, the second and subsequent layers do not fall off. The carbon fiber sheets can be fixed together by, for example, stitching the layers together with fiber or by binding the layers with a resin. Microscopic observation of a cross-section of the electrode in which carbon fiber sheets are fixed together reveals a layer structure.

The electrode to be used for the redox flow battery according to the present invention can be used for both a flow-through type cell and a flow-by type cell, but use of the electrode in a flow-through type cell is one of preferred aspects. The flow-through type is a type in which to an electrode sandwiched between an ion-exchange film and a current collector having no groove, an electrolytic solution is supplied from an end surface of the electrode, so that the electrolytic solution flows in the plane direction of the electrode. When the electrode is used for a flow-through type cell, the electrolytic solution is spread in a direction other than the liquid feeding direction in a gap portion formed on the electrode at the time of passing through the electrode, whereby localization of liquid flow-through paths can be prevented to uniformize liquid flow-through. In a flow-through type redox flow battery, the liquid flow-through path depends on the gap size and arrangement of the electrode, so that localization of the liquid flow-through path easily occurs, and the effect of uniformizing liquid flow-through by the electrode to be used for the redox flow battery according to the present invention is notably obtained.

On the other hand, a flow-by type is one of preferred aspects. The flow-by type is a type in which to an electrode sandwiched between an ion-exchange film and a current collector having a groove, an electrolytic solution is supplied from the groove of the current collector, so that the electrolytic solution flows. When the electrode is used for the flow-by type cell, the electrolytic solution easily moves in the thickness direction of the electrode. In the flow-by type redox flow battery, the electrolytic solution is moved from a groove to a groove in the current collector, so that it is difficult for the electrolytic solution to sufficiently move in the thickness direction especially when the electrode has a large thickness, and the effect of uniformizing liquid flow-through by the electrode to be used for the redox flow battery according to the present invention is notably obtained. The shape of a groove in a current collector which is used for a flow-by type redox flow battery and has a groove may be a shape known for a redox flow battery or solid polymer fuel cell, such as a parallel shape, a columnar shape, a serpentine shape or a comb shape.

EXAMPLES

[Measurement Example 1] Electrode Thickness

Using DIGIMICRO MFC-101 (manufactured by Nikon Corporation), the thickness of a sample was measured at each of nine points by a φ5 mm terminal with pressure applied to a measurement terminal portion at 0.15 MPa, and the average thereof was defined as a thickness.

[Measurement Example 2] Morphology of Irregularities

Using a shape measuring microscope (VR-3050, manufactured by Keyence Corporation), the electrode was scanned from the irregularity-formed surface side thereof with a visual field at a magnification of 25 times to capture an image, inclination correction was performed using shape analysis software, and a height profile was displayed so as to pass through the bottom portion of the recess, and defined as a representative value of the depth. In addition, the area ratio (opening/total area) of portions having thickness smaller than the size of a surface corresponding to the electrode thickness calculated in Measurement Example 1 was determined as an opening area ratio. The measurement was performed at nine points, and an average thereof was used.

[Measurement Example 3] Presence or Absence of Broken Fiber at Peripheral Edge Portion of Recess or Through-Hole When the result of observation with a scanning electron microscope showed that a majority of 20 or more adjacent recesses or through-holes had no broken fibers on the peripheral edge portions of the recesses or through-holes, it was determined that there were no broken fibers.

[Measurement Example 4] Discharge Test in Flow-Through Type Cell

The electrode was cut into squares of 9 $cm^2$, a cation-exchange membrane (Nafion NRE-212, manufactured by Du Pont) was disposed between these electrodes, and these electrodes were sandwiched between current collectors having no groove to obtain a single cell of flow-through type. 200 ml of each of 1 M pentavalent or tetravalent vanadium (4 M sulfuric acid) as a positive electrolytic solution and 1 M divalent or trivalent vanadium (4 M sulfuric acid) as a negative electrolytic solution was provided in a tank, and circulated at 5 ml/min. The maximum power density was measured by performing sweeping at a rate of 10 mV/second until the cell voltage reached 0.1 V from a state in which the open circuit voltage was 1.5 V.

Example 1

A flameproof crimped thread of polyacrylonitrile fiber having a fiber diameter of 15 μm was cut to a number average fiber length of 51 mm, formed into a sheet with a card and or cross-layer, and then subjected to needle punching at a needle density of 500 threads/$cm^2$ to obtain a carbon fiber precursor nonwoven fabric having an apparent density of 0.10 g/$cm^3$. One surface of the carbon fiber precursor nonwoven fabric was embossed using a metallic embossing roll in which cylindrical projections having a diameter of 300 μm and a height of 110 μm were dispersively formed, the area ratio of the projections to the carbon fiber precursor nonwoven fabric was 50%, and a dot pattern with a pitch of 380 μm and a formation density of 700 dots/cm² was provided. Thereafter, heat treatment was performed at 2400° C. for 15 minutes to obtain a carbon fiber nonwoven fabric in which recesses (non-through-holes) having a thickness of 200 μm, an average opening diameter of 270 μm and a depth of 100 μm were dispersively formed in a dotted pattern. Ten sheets of the carbon fiber nonwoven fabric were stacked without being fixed, so that an electrode having a basis weight of 200 g/m² was obtained.

A discharge test was conducted using the electrode, and the result showed that the maximum power density was 0.22 W/cm².

Example 2

Figure 1:
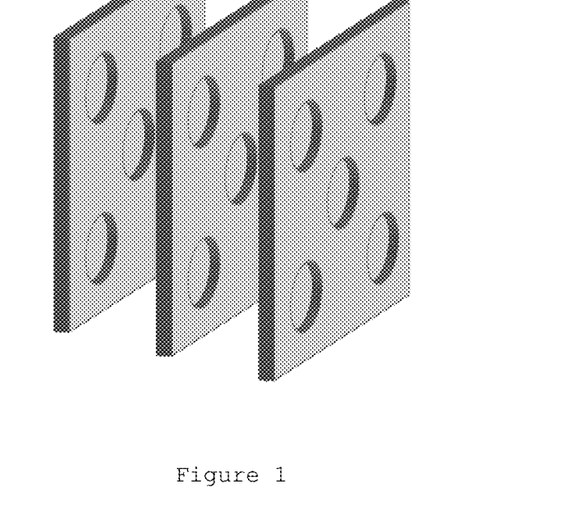
FIG. 1 is an exploded perspective view schematically showing an electrode for redox flow batteries, which is formed by stacking carbon fiber sheets having non-through-holes dispersively formed in a dot pattern.
Figure 2:
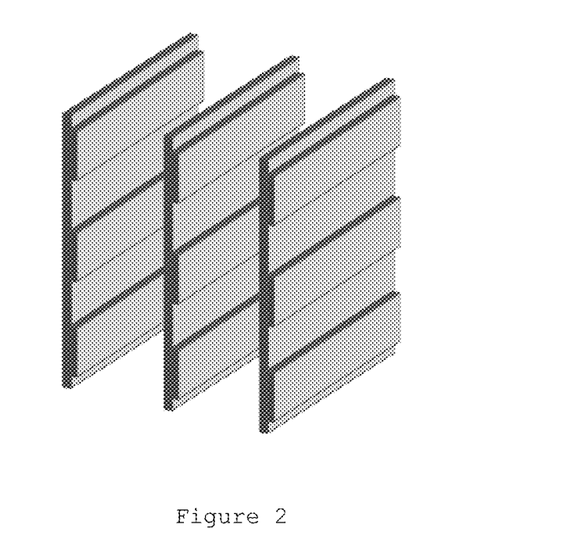
FIG. 2 is an exploded perspective view schematically showing an electrode for redox flow batteries, which is formed by stacking carbon fiber sheets in which a plurality of grooves is formed.
Figure 3:
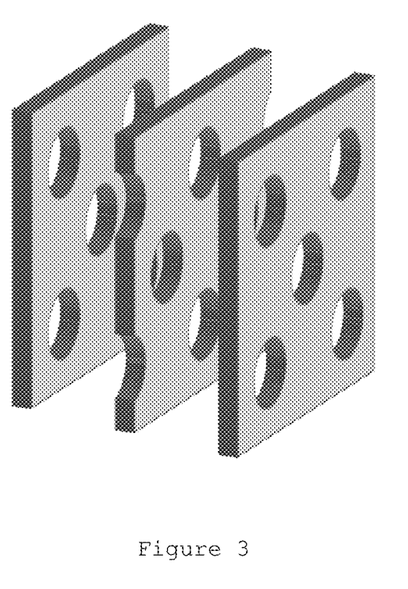
FIG. 3 is an exploded perspective view schematically showing an electrode for redox flow batteries, which is formed by stacking carbon fiber sheets having through-holes dispersively formed in a dot pattern.

A carbon fiber having a fiber diameter of 7 μm was cut to 10 mm, dispersed in water, and continuously formed into a sheet by a wet papermaking method. Further, an aqueous polyvinyl alcohol solution as a binder was applied to the sheet, and dried to prepare a carbon fiber sheet body. Thereafter, the carbon fiber sheet body was immersed in a liquid obtained by diluting a phenol resin as a thermosetting resin with methanol, taken out, heated and dried at 100° C. for 5 minutes to prepare a preliminary impregnated body. Next, heat treatment was performed at 180° C. while pressure was applied with a flat plate press. Thereafter, heat treatment was performed at 2400° C. for 15 minutes to obtain carbon paper having a thickness of 200 μm. The carbon paper was irradiated with a YAG laser beam with a beam diameter of 100 μm to form through-holes, thereby obtaining carbon paper in which through holes having an average hole diameter of 300 μm were dispersively formed in a dotted pattern with a formation density of 700 dots/cm² and a pitch of 380 μm. As shown in FIG. 3, ten sheets of the carbon paper were stacked without being fixed such that the through-holes were not continuously formed. Thus, an electrode having a basis weight of 200 g/m² was obtained.

A discharge test was conducted using the electrode, and the result showed that the maximum power density was 0.20 W/cm².

Example 3

Except that In place of the embossing roll described in Example 1, a metallic embossing roll on which ridge protrusions having a width of 225 μm and a height of 110 μm were formed at 450 μm was used to perform embossing, the same procedure as in Example 1 was carried out to obtain a carbon fiber nonwoven fabric in which grooves having a width of 200 μm, a depth of 100 μm were formed at a pitch of 450 μm in a striped shape. Ten sheets of the carbon fiber nonwoven fabric were stacked without being fixed such that all the grooves are formed in the same direction. Thus, an electrode was obtained.

A discharge test was conducted with the thus-obtained electrode disposed such that the grooves extended in a direction perpendicular to the flow of the electrolytic solution, and the result showed that the maximum power density was 0.20 W/cm². In addition, a discharge test was conducted with the electrode disposed such that the groove formation direction was parallel to the flow direction of the electrolytic solution, and the result showed that the maximum power density was 0.14 W/cm².

Example 4

Except that embossing was performed using, in place of the embossing roll described in Example 1, a metallic embossing roll in which cylindrical projections having a diameter of 45 μm and a height of 110 μm were dispersively formed, and the ratio of the area of the projections to the area of the carbon fiber precursor nonwoven fabric was 10%, and a dot pattern with a pitch of 130 μm and a formation density of 6300 dots/cm² was provided, the same procedure as in Example 1 was carried out to obtain a carbon fiber nonwoven fabric in which recesses (non-through-holes) having an average opening diameter of 40 μm and a depth of 100 μm were dispersively formed in a dotted shape. Ten sheets of the carbon fiber nonwoven fabric were stacked without being fixed, so that an electrode having a basis weight of 200 g/m² was obtained.

A discharge test was conducted using the thus-obtained electrode, and the result showed that the maximum power density was 15 W/cm².

Example 5

Except that embossing was performed using, in place of the embossing roll described in Example 1, a metallic embossing roll in which cylindrical projections having a diameter of 300 μm and a height of 110 μm were dispersively formed, and the ratio of the area of the projections to the area of the carbon fiber precursor nonwoven fabric was 75%, and a dot pattern with a pitch of 310 μm and a formation density of 1000 dots/cm² was provided, the same procedure as in Example 1 was carried out to obtain a carbon fiber nonwoven fabric in which recesses (non-through-holes) having an average opening diameter of 270 μm and a depth of 100 μm were dispersively formed in a dotted shape. Ten sheets of the carbon fiber nonwoven fabric were stacked without being fixed, so that an electrode having a basis weight of 200 g/m² was obtained.

A discharge test was conducted using the thus-obtained electrode, and the result showed that the maximum power density was 0.13 W/cm².

Comparative Example 1

Except that press processing was performed using, in place of the embossing described in Example 1, a pair of flat rolls, the same procedure as in Example 1 was carried out to prepare an electrode. A discharge test was conducted using the electrode, and the result showed that the maximum power density was 0.11 W/cm².

Example 6

Except that the carbon fiber nonwoven fabric was fixed with a cyanoacrylate-based adhesive, the same procedure as in Example 1 was carried out to obtain an electrode. The obtained electrode was more easily transported and set to a sample than an electrode in which the carbon fiber nonwoven fabric was not fixed.

Table 1 shows the configurations of the electrodes prepared in examples and comparative examples and the results of the discharge tests of these electrodes.

TABLE 1

| | Carbon fiber sheet | Irregularities of carbon fiber sheet | | | | Number of sheets stacked | Electrode thickness | Maximum power density |
| | | Shape | Depth | Ratio of height of irregularities to thickness | Opening area ratio | Broken fiber at peripheral edge portion of recesses or through-holes | | | |
|---|---|---|---|---|---|---|---|---|---|
| Example 1 | Nonwoven fabric | Dotted non-through-hole | 100 μm | 0.5 | 50% | Absent | 10 | 2 mm | 0.22 W/cm$^2$ |
| Example 2 | Paper | Dotted through-hole | 200 μm | — | 10% | Present | 10 | 2 mm | 0.20 W/cm$^2$ |
| Example 3 | Nonwoven fabric | Striped groove | 100 μm | 0.5 | 40% | Absent | 10 | 2 mm | 0.20 W/cm$^2$ (Orthogonal arrangement) 0.14 W/cm$^2$ (Parallel arrangement) |
| Example 4 | Nonwoven fabric | Dotted non-through-hole | 100 μm | 0.5 | 10% | Absent | 10 | 2 mm | 0.15 W/cm$^2$ |
| Example 5 | Nonwoven fabric | Dotted non-through-hole | 100 μm | 0.5 | 75% | Absent | 10 | 2 mm | 0.13 W/cm$^2$ |
| Comparative Example 1 | Nonwoven fabric | — | — | — | — | Absent | 10 | 2 mm | 0.11 W/cm$^2$ |

The invention claimed is:

1. An electrode comprising a plurality of carbon fiber sheets that are stacked in a thickness direction such that adjacent sheets contact each other,
wherein each carbon fiber sheet has a surface with irregularities or at least one through-hole, or a combination thereof, and
wherein the surface irregularities or through-holes of the carbon fiber sheets form gaps in the thickness direction between adjacent stacked carbon fiber sheets such that no openings extend through the entire stack of carbon fiber sheets in the thickness direction.

2. The electrode according to claim 1, wherein three or more of the carbon fiber sheets are stacked.

3. The electrode according to claim 1, wherein the plurality of stacked carbon fiber sheets stacked are fixed together.

4. The electrode according to claim 1, wherein each of the carbon fiber sheet surfaces have a plurality of circular shaped holes that do not extend through the carbon fiber sheet.

5. The electrode according to claim 1, wherein each of the carbon fiber sheets has a plurality of through-holes.

6. The electrode according to claim 1, wherein the irregularities of each of the surfaces of the carbon fiber sheets are a plurality of grooves formed on the surface of each carbon fiber sheet.

7. A redox flow battery comprising a cell formed so as to include the electrode according to claim 1.

8. The redox flow battery according to claim 7, wherein the cell is a flow-through type cell.

9. The redox flow battery according to claim 7, wherein the cell is a flow-by type cell.

10. A method for producing an electrode which comprises stacking a plurality of carbon fiber sheets in a thickness direction such that adjacent sheets contact each other,
wherein each carbon fiber sheet has a surface with irregularities or at least one through-hole, or a combination thereof, and
wherein the surface irregularities or through-holes of the carbon fiber sheets form gaps in the thickness direction between adjacent stacked carbon fiber sheets such that no openings extend through the entire stack of carbon fiber sheets in the thickness direction.

11. The method for producing an electrode according to claim 10, wherein the plurality of carbon fiber sheets stacked is fixed together.

* * * * *